US012654880B2

(12) United States Patent
Dressler et al.

(10) Patent No.: US 12,654,880 B2
(45) Date of Patent: Jun. 16, 2026

(54) METHOD OF MANUFACTURING AN AIRCRAFT WINDOW FRAME

(71) Applicants:Airbus Operations SAS, Toulouse (FR); Airbus Operations S.L., Getafe (ES)

(72) Inventors: Günther Dressler, Immenstaad (DE); Asuncion Butragueno-Martinez, Getafe (ES); Rodolphe Trouve, Toulouse (FR); Dirk Feltin, Dresden (DE)

(73) Assignees: Airbus Operations SAS, Toulouse (FR); Airbus Operations S.L., Getafe (ES)

( * ) Notice: Subject to any disclaimer, the term of this patent is extended or adjusted under 35 U.S.C. 154(b) by 187 days.

(21) Appl. No.: 18/530,281

(22) Filed: Dec. 6, 2023

(65) Prior Publication Data

US 2024/0199231 A1 Jun. 20, 2024

(30) Foreign Application Priority Data

Dec. 15, 2022 (FR) ...................................... 2213481

(51) Int. Cl.
| | |
|---|---|
| *B64F 5/10* | (2017.01) |
| *B64C 1/14* | (2006.01) |
| *B64C 1/00* | (2006.01) |

(52) U.S. Cl.
CPC .............. *B64F 5/10* (2017.01); *B64C 1/1484* (2013.01); *B64C 2001/0072* (2013.01)

(58) Field of Classification Search
CPC ..... B64F 5/00; B64F 5/10; B64C 1/12; B64C 1/14; B64C 1/1407; B64C 1/1484; B64C 1/1492; B64C 2001/0072
See application file for complete search history.

(56) References Cited

U.S. PATENT DOCUMENTS

| | | | | | |
|---|---|---|---|---|---|
| 5,027,569 | A | * | 7/1991 | Keys ......................... | B60J 10/70 52/204.591 |
| 7,028,950 | B2 | * | 4/2006 | Salmon ................. | B64C 1/1492 244/129.3 |

(Continued)

OTHER PUBLICATIONS

French Search Report for corresponding French Patent Application No. 2213481 dated Jul. 25, 2023; priority document.

*Primary Examiner* — Chi Q Nguyen
(74) *Attorney, Agent, or Firm* — Greer, Burns & Crain, Ltd.

(57) ABSTRACT

A method of manufacturing an aircraft window frame, the frame having a first surface that has at least first and second faces extending all around the frame and connected by a curved junction zone, the frame being made of a composite material that includes fibers embedded in a resin matrix. The method includes steps of: assembling fiber layers and at least one reinforcement situated at the level of the junction zone and having first and second peripheral edges; consolidating or polymerizing of the assembly; and removing the frame from the mold. During the step of assembling, a barrier layer is positioned between the reinforcement and the first surface to cover the reinforcement and to form a barrier limiting propagation of resin in the direction of the first surface. A window frame obtained by using that method is provided as well as an aircraft including the frame.

12 Claims, 4 Drawing Sheets

(56)  References Cited

U.S. PATENT DOCUMENTS

| | | | |
|---|---|---|---|
| 7,175,795 B2 | 2/2007 | Eberth et al. | |
| 8,096,506 B2 | 1/2012 | Bold | |
| 8,544,798 B2 * | 10/2013 | Eberth | B64C 1/12 |
| | | | 244/129.1 |
| 8,741,208 B2 * | 6/2014 | Nothdurft | B29C 70/48 |
| | | | 425/389 |
| 8,944,381 B2 * | 2/2015 | Ebner | B64C 1/1492 |
| | | | 244/129.3 |
| 9,221,533 B1 * | 12/2015 | Grady | B64C 1/1484 |
| 2003/0222371 A1 | 12/2003 | Edelmann et al. | |
| 2003/0234322 A1 * | 12/2003 | Bladt | B64C 1/1484 |
| | | | 244/129.3 |
| 2008/0067288 A1 * | 3/2008 | Eberth | B64C 1/1492 |
| | | | 244/129.3 |
| 2008/0078494 A1 * | 4/2008 | Nordman | B29C 70/088 |
| | | | 156/168 |
| 2009/0202763 A1 | 8/2009 | Rose et al. | |
| 2010/0096063 A1 | 4/2010 | Friddell | |
| 2011/0186684 A1 * | 8/2011 | Eberth | B64C 1/12 |
| | | | 244/129.3 |
| 2012/0119031 A1 | 5/2012 | Ainsworth | |
| 2015/0047275 A1 * | 2/2015 | McCarthy | B64C 1/14 |
| | | | 52/204.51 |
| 2015/0231834 A1 | 8/2015 | Modin et al. | |
| 2020/0115027 A1 * | 4/2020 | Pelletier | B64C 27/04 |
| 2024/0199233 A1 * | 6/2024 | Butragueno-Martinez | |
| | | | B32B 5/073 |

* cited by examiner

800

Assembling fiber layers and at least one reinforcement situated at the level of the junction zone — 810

Scattering resin between the layers and heating — 815

Consolidating or polymerizing the frame assembly — 820

Removing the aircraft window frame from the mold — 830

METHOD OF MANUFACTURING AN AIRCRAFT WINDOW FRAME

CROSS-REFERENCES TO RELATED APPLICATIONS

This application claims the benefit of the French patent application No. 2213481 filed on Dec. 15, 2022, the entire disclosures of which are incorporated herein by way of reference.

FIELD OF THE INVENTION

The present invention relates to a method of manufacturing an aircraft window frame including a barrier layer, a window frame obtained by that method and an aircraft including at least one such window frame.

BACKGROUND OF THE INVENTION

In accordance with one prior art embodiment that can be seen in FIGS. 1 to 2 the fuselage 10 of an aircraft includes a wall 12 having an exterior face 12.1 and an interior face 12.2 and a plurality of windows 14.

In line with each window 14 the wall 12 includes an opening 16 delimited by an edge 16.1 connecting the exterior and interior faces 12.1, 12.2. As depicted in FIG. 3 each window 14 includes a frame assembly 18 supporting two transparent walls 20, 20' and a peripheral seal 22. The frame assembly 18 includes a first frame 18.1 connected to the wall 12 and a second frame 18.2 connected to the first frame 18.1 by connecting elements 18.3, the transparent walls 20, 20' and the peripheral seal 22 being interleaved between the first and second frames 18.1, 18.2.

The first frame 18.1 includes a first part 26 positioned in the opening 16, a second part 28 pressed against the interior face 12.2 of the wall 12 of the fuselage, an intermediate part 30 connecting the first and second parts 26, 28 and a third part 32 connected to and substantially perpendicular to the second part 28, the second frame 18.2 bearing against the third part 28. In one configuration the intermediate part 30 is situated at a first end of the second part 28 and the third part 32 is situated at a second end of the second part 28 and with the latter forms an L. Once the frame assembly 18 has been fitted, the first part 26 has an exterior face 26.1 flush with the exterior face 12.1 of the wall 12 of the fuselage and an interior face 26.2 substantially parallel to the exterior face 26.1. The second part 28 has an exterior face 28.1 pressed against the interior face 12.2 of the wall 12 of the fuselage and offset toward the interior relative to the exterior face 26.1 of the first part 26, and an interior face 28.2 substantially parallel to the exterior face 28.1. The intermediate part 30 has an exterior face 30.1 connecting the exterior faces 26.1, 28.1 of the first and second parts 26, 28 and an interior face 30.2 connecting the interior faces 26.2, 28.2 of the first and second parts 26, 28.

Thus, the first frame 18.1 has:
a first surface S1 consisting of the exterior faces 26.1, 28.1, 30.1 of the first and second parts 26, 28 and the interior part 30,
a second surface S2 consisting of the interior faces 26.2, 28.2, 30.2 of the first and second parts 26, 28 and the interior part 30.

From the geometrical point of view, the junction zone 33 connecting the exterior faces 26.1, 30.1 of the first part 26 and of the intermediate part 30 is highly curved in order for the exterior face 30.1 of the intermediate part 30 to be substantially parallel to the edge 16.1 of the opening 16 and spaced at a small distance from the edge 16.1. This geometry enables limitation of aerodynamic disturbances.

In one embodiment, the first frame 18.1 is made in one piece and of composite material and contains reinforcing fibers embedded in a resin matrix.

As depicted in FIGS. 4 and 5, the first frame 18.1 includes layers of fibers 34, 34', 34'', reinforcements 36, a conductive material layer 38, and stitches 40 for holding the layers 34, 38 and the reinforcements 36 together. By way of example, the conductive material layer 38 is a copper mesh and enables a lightning protection layer to be obtained.

In an embodiment seen in FIG. 5, the first frame 18.1 includes from the first surface S1:
a conductive material layer 38 that extends over the exterior face 26.1 of the first part 26 and is extended at the level of the highly curved junction zone 33,
two fiber layers 34, 34' that extend over the exterior faces 28.1, 30.1 of the second part 28 and of the intermediate part 30 and at the level of the highly-curved junction zone 33,
a reinforcement 36 with a D-shape section positioned at the level of the highly-curved junction zone 33.

The first frame 18.1 generally includes other fiber layers 34'', the reinforcement 36 being interleaves between the fiber layers 34', 34''.

As depicted in FIG. 5 the stitches 40 connect at least the first and second fiber layers 34, 34' and the reinforcement 36 and are positioned at the level of the first and second parts 26, 28 and of the intermediate part 30.

After application of the stitches 40, the assembly of the fiber layers 34, the reinforcements 36 and the conductive material layer 38 is consolidated or polymerized. During this consolidation or polymerization step, the fibers of the fiber layers 34, 34' are embedded in a heatset resin by a resin transfer molding process.

Following the consolidation or polymerization step, the first frame 18.1 includes, at the level of the first surface S1, resin accumulation zones at the level of the stitches 40 and at the level of the highly-curved junction zone 33 because of the presence of the reinforcement 36 with a D-shape section. Because of the localized surplus resin, the exterior face 26.1 of the first part 26 of the first frame 18.1 therefore does not exhibit a homogeneous behavior, in particular at the level of the highly-curved junction zone 33.

Following assembly of the aircraft, and, in particular, after fitting the windows 14, the exterior face 12.1 of the wall 12 of the fuselage is covered with at least one layer of paint that also covers the exterior face 26.1 of the first part 26 of the first frame 18.1 of each window 14.

Because the exterior face 26.1 of the first part 26 of the first frame 18.1 does not exhibit a homogeneous behavior, this can generate a visual modification of the paint.

The present invention aims to remedy some or all of the disadvantages of the prior art.

SUMMARY OF THE INVENTION

To this end the invention has for an object a method of manufacturing an aircraft window frame, the frame having a first surface that has at least first and second faces extending all around the frame and connected by a curved junction zone, the frame being made of a composite material that includes fibers embedded in a resin matrix. This method of manufacture includes a step of assembling fiber layers and at least one reinforcement situated at the level of the junction zone and having first and second peripheral edges, a step of consolidation or polymerization of the assembly, and a step of removing the frame from the mold.

According to the invention, during the assembly step a barrier layer is positioned between the reinforcement and the first surface in such a manner as to cover the reinforcement and to form a barrier limiting propagation of resin in the direction of the first surface.

The presence of this barrier layer makes it possible to prevent propagation of the resin toward the first surface and the formation of localized accumulations of resin. The exterior surface of the frame therefore exhibits a more homogeneous behavior and does not generate any visual modification of the paint.

In accordance with other features, separately or in combination:

during the assembly step, the barrier layer is positioned in contact with the reinforcement;
  the barrier layer does not extend beyond the first and second peripheral edges of the reinforcement;
  at least one seam is produced in such a manner as to connect at least the reinforcement and the barrier layer, the seams comprising stitching offset from the first surface at least at the level of the first and second faces;
  the method includes a step of sprinkling resin between the fiber layers and heating to a temperature below a polymerization or consolidation temperature to activate the tackiness of the resin in order to keep the various layers interconnected before the consolidation or polymerization step.

The invention also has for an object an aircraft window frame, including a first surface that has at least first and second faces extending all around the frame and connected by a curved junction zone, the frame being made of a composite material that includes fibers embedded in a resin matrix, the frame including stacked layers of fibers and at least one reinforcement situated at the level of the junction zone and having first and second peripheral edges.

In accordance with the invention, the frame includes at least one barrier layer covering the reinforcement, positioned between the reinforcement and the first surface and configured to form a barrier limiting propagation of resin the direction of the first surface.

In accordance with other features, separately or in combination:

the barrier layer is in contact with the reinforcement;
  the barrier layer does not extend beyond the first and second peripheral edges of the reinforcement;
  the barrier layer includes at least one ply of glass fibers;
  the frame includes at least one seam connecting at least the reinforcement and the barrier layer and including stitching spaced from the first surface.

The invention also has for an object an aircraft including at least one window frame having any of the above features.

BRIEF DESCRIPTION OF THE DRAWINGS

Other features and advantages thereof will emerge from the following description of the invention given by way of example only with reference to the appended drawings in which.

4

Figures 1, 2, 3:
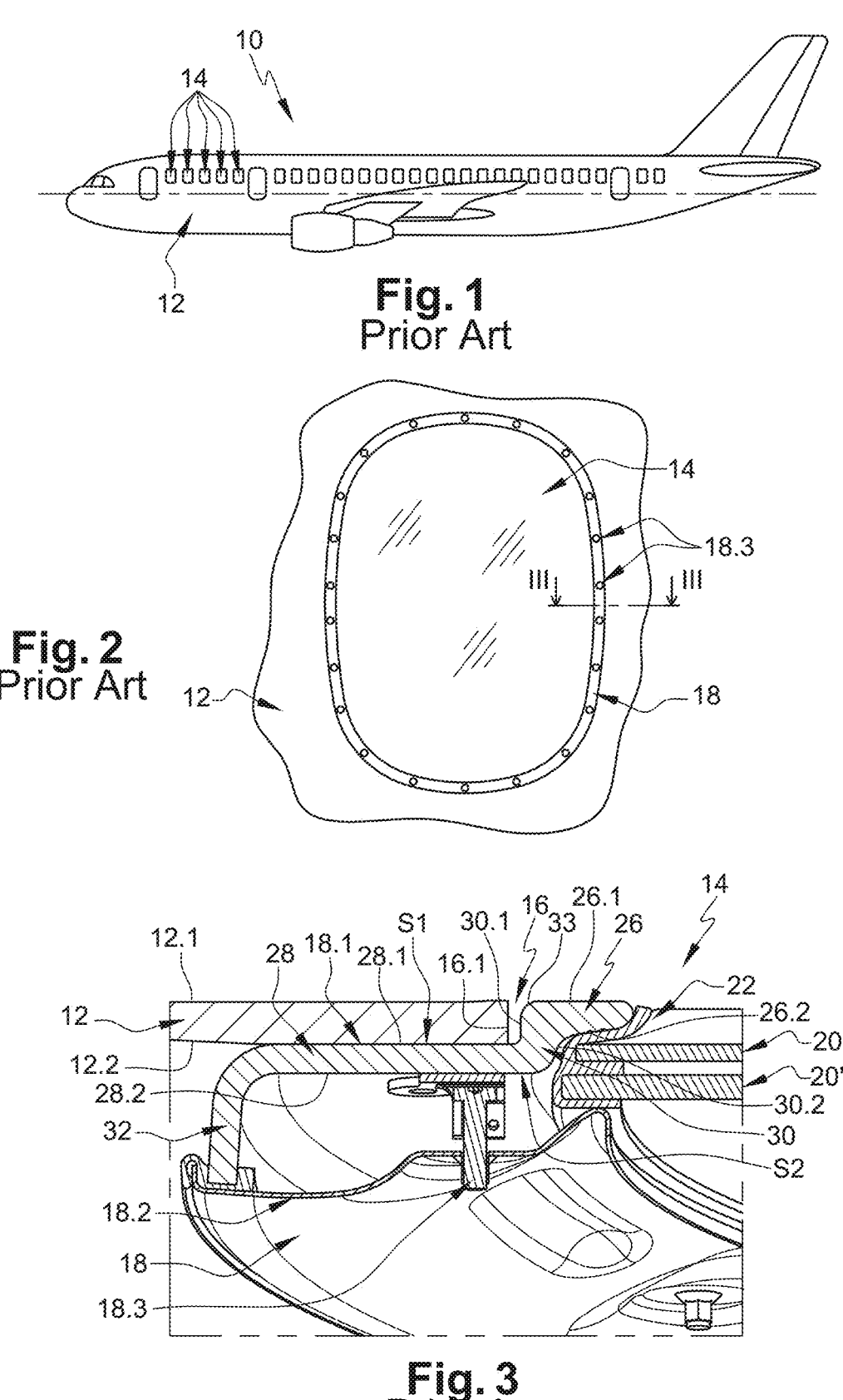
FIG. 1 is a lateral view of an aircraft.
FIG. 2 is a front view of a window.
FIG. 3 is a section taken along the line III-III in FIG. 2 of a frame assembly of a window depicting one embodiment of the prior art.
Figure 4:
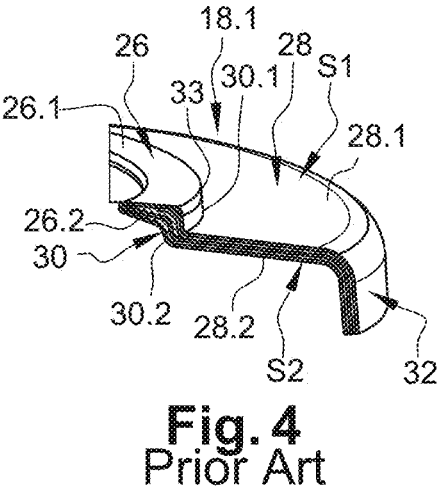
FIG. 4 is a perspective view of a part of a first window frame depicting a first embodiment of the prior art.
Figure 5:
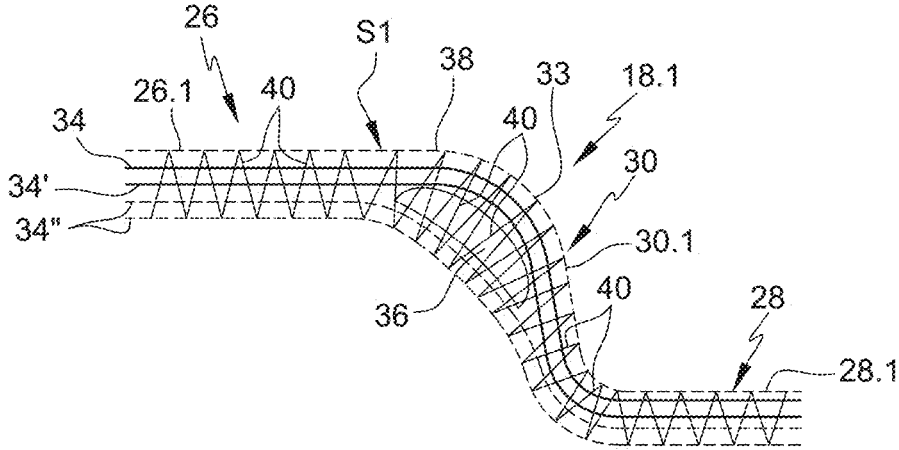
Figures 6, 7:
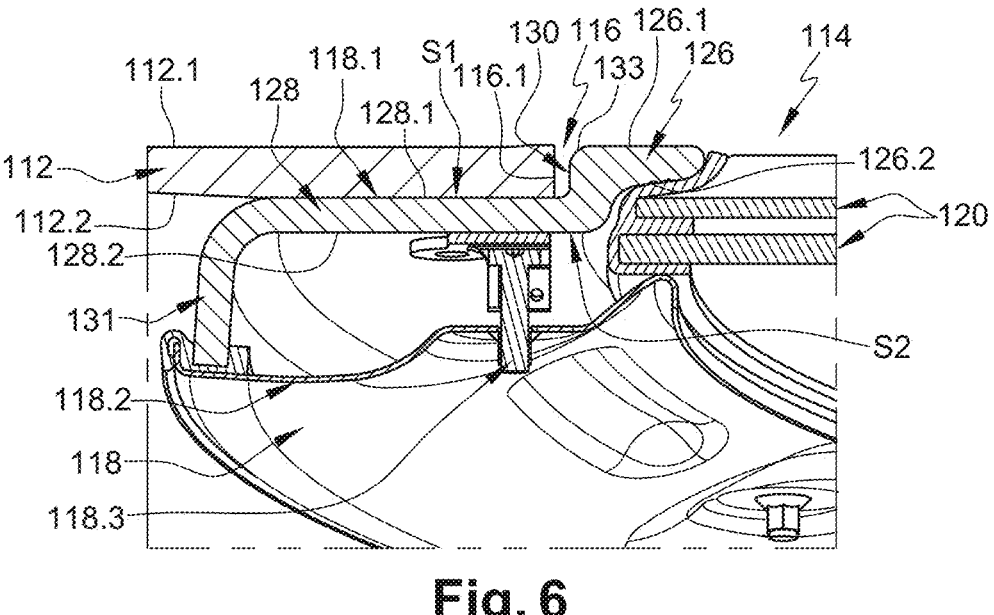
Figure 8:
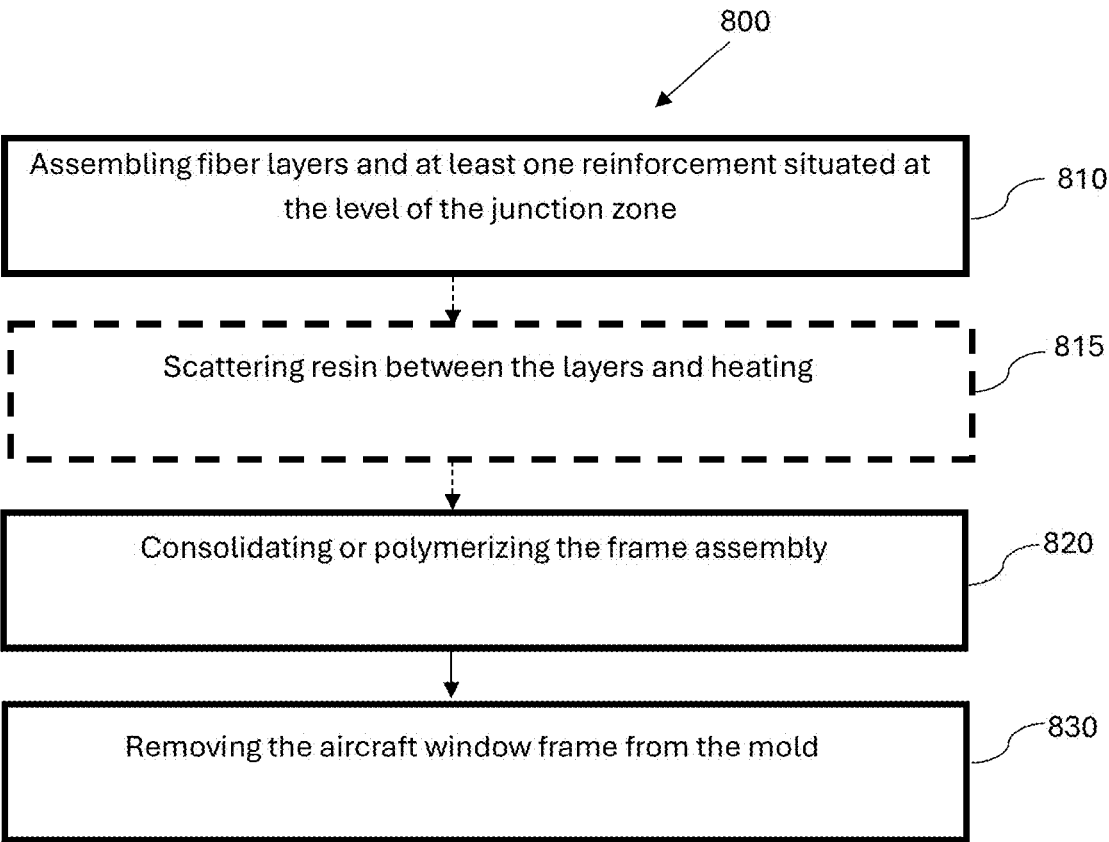

FIG. 5 is a schematic section of a window frame depicting one embodiment of the prior art, FIG. 6 is a section of a window frame structure depicting one embodiment of the invention, FIG. 7 is a schematic section of a window frame depicting one embodiment of the invention, and, FIG. 8 is a flow diagram of a method according to one or more embodiments of the invention.

DETAILED DESCRIPTION OF THE PREFERRED EMBODIMENTS

As depicted in FIG. 6, a fuselage wall 112 of an aircraft has an exterior face 112.1, an interior face 112.2 opposite the exterior face 112.1 and at least one window 114 positioned at the level of an opening 116 delimited by an edge 116.1 connecting the exterior and interior faces 112.1, 112.2. The window 114 includes at least one transparent wall 120 and a frame structure assembly 118 situated around the transparent wall 120 and configured to connect it to the fuselage wall 112. This frame assembly 118 includes first and second frames 118.1, 18.2 between which the transparent wall 120 of the window 114 is positioned.

The first frame 118.1 has a first part 126 configured to be positioned in the opening 116 in the fuselage wall 112 and a second part 128 configured to be pressed against the interior face 112.2 of the fuselage wall 112.

When the frame assembly 118 is positioned in an opening 116 in the fuselage wall 112, the first part 126 has an exterior face 126.1 flush with the exterior face 112.1 of the fuselage wall 112 and an interior face 126.2 opposite the exterior face 126.1. The second part 128 has an exterior face 128.1 pressed against the interior face 112.2 of the fuselage wall 112 and an interior face 128.2 opposite the exterior face 128.1.

In one configuration, the first and second parts 126, 128 are connected directly. In this configuration the first part 126 has a lateral face 130 facing the edge 116.1 of the opening 116 in the fuselage wall 112.

In another configuration, the first frame 118.1 includes an intermediate part connecting the first and second parts 126, 128, that has a lateral face 130 connecting the exterior faces 126.1, 128.1 of the first and second parts 126, 128 configured to face the edge 116.1 of the opening 116 in the fuselage wall 112.

The first frame 118.1 may include other parts, such as a third part 131 connected and substantially perpendicular to the second part 128, the second frame 118.2 of the frame assembly 118 bearing in use against this third part 131.

In these configurations, the first frame 118.1 has a first surface S1 including at least the exterior faces 126.1, 128.1 of the first and second parts 126, 128 and the lateral face 130 connecting the exterior faces 126.1, 128.1 and configured to face the edge 116.1 of the opening 116 in the fuselage wall 112.

From the geometrical point of view, the first surface S1 of the first frame 118.1 includes a junction zone 133 connecting the exterior face 126.1 of the first part 126 and the lateral face 130 that is highly curved in order for the lateral face 130 to be substantially parallel to the edge 116.1 of the opening 116 in the fuselage wall 112 and at a small distance from the edge 116.1. This geometry makes it possible to limit aerodynamic disturbances.

Regardless of the embodiment, a window 114 in a fuselage wall 112 of an aircraft includes at least one frame 118.1 having a first surface S1 that extends all around the frame 118.1.

This first surface S1 has at least first and second faces extending all around the frame 118.1 and connected by a curved junction zone 133 that also extends all around the frame 118.1. The first surface S1 may have other faces. The first face corresponds to the exterior face 126.1 of the first part 126 of the frame 118.1. It is substantially planar and visible from outside the aircraft when the window 114 is positioned in the opening 116 in the fuselage wall 112. When the frame 118.1 is positioned in an opening 116 in the fuselage wall 112, the first face 126.1 is flush with the exterior face 112.1 of the fuselage wall 112. The second face corresponds the lateral face 130. It is substantially perpendicular to the first face 126.1. The junction zone 133 is highly curved.

In one embodiment, the frame 118.1 is made in one piece and of composite material and contains fibers embedded in a resin matrix. The resin is preferably a heatset resin.

As depicted in FIG. 7, the frame 118.1 includes fiber layers 132, 134 and at least one reinforcement 136 situated at the level of the junction zone 133.

This reinforcement 136 extends all around the frame 118.1 and has a D-shape section. It extends between first and second peripheral edges 136.1, 136.2. This reinforcement 136 may take the form of an optionally pre-impregnated fiber preform. It is not described further because it may be identical to that known from the prior art.

The frame 118.1 may include other reinforcements.

In one embodiment, the frame 118.1 includes from the first surface S1:

a first layer 132 of dry fibers at the level of the first surface S1 that extends over all of the first surface S1, intermediate layers 134 of dry fibers positioned under the first layer 132 that extend over all the first surface S1, a reinforcement 136 with a D-shape section positioned at the level of the highly-curved junction zone 133.

The frame 118.1 generally includes interior layers 134' of dry fibers, the reinforcement 136 being interleaved between the intermediate and interior layers 134, 134'.

In a simplified variant, the frame 118.1 does not include any intermediate layer 134 between the first layer 132 and the reinforcement 136. In one configuration, the frame 118.1 includes a single intermediate layer 134 between the first layer 132 and the reinforcement 136.

The first layer 132 covers and extends on either side of the reinforcement 136, beyond the first and second peripheral edges 136.1, 136.2. In one configuration, the first layer 132 covers all the first face corresponding to the exterior face 126.1 of the first part 126. It may also cover all the second face corresponding to the lateral face 130.

The intermediate layers 134 cover and extend on either side of the reinforcement 136 beyond the first and second peripheral edges 136.1, 136.2. In one configuration, the intermediate layers 134 cover all the first face corresponding to the exterior face 126.1 of the first part 126. They may also cover all the second face corresponding to the lateral face 130.

The fibers of the various layers 132, 134, 134' are carbon fibers. Of course, the invention is not limited to this material.

The various layers 132, 134, 134' may be woven or non-woven layers.

The various layers 132, 134, 134' contain fibers that may be oriented in the same manner or in different manners.

In accordance with one feature, the frame 118.1 includes at least one barrier layer 138 covering the reinforcement 136, interleaved between the reinforcement 136 and the first surface S1, and configured to limit propagation of resin from the reinforcement 136 toward the first surface S1. The presence of this barrier layer 138 at the level of the junction zone 133 makes it possible to prevent propagation of resin toward the first surface S1 and the formation of localized zones of accumulation of resin. The exterior surface S1 of the frame 118.1, therefore, exhibits a more homogeneous behavior and does not generate any visual modification of the paint.

In one configuration, the frame 118.1 includes a single barrier layer 138.

In one arrangement, the barrier layer 138 is in contact with the reinforcement 136. It is interleaved between the reinforcement 136 and the intermediate layers 134.

In one non-limiting configuration, the barrier layer 138 extends from the first peripheral edge 136.1 of the reinforcement 136 as far as its second peripheral edge 136.2. It does not extend beyond the first and second peripheral edges 136.1, 136.2 of the reinforcement 136.

In one embodiment, the barrier layer 138 includes at least one ply of glass fibers. Of course, the invention is not limited to this material.

In one configuration, the barrier layer 138 is a woven ply with a small mesh size limiting the propagation of resin through the barrier layer 138.

In one embodiment, the frame 118.1 includes at least one first seam 140 connecting at least the reinforcement 136 and at least some layers, such as the barrier layer 138, the first seam 140 including stitching that does not pass through any fiber layer 132, 134 present between the reinforcement 136 and the first surface S1, at least at the level of the first face (corresponding to the exterior face 126.1 of the first part 126) and the junction zone 133. Regardless of the embodiment, the stitching of the first seam 140 does not reach the first face S1 and is offset relative to the latter in such a manner as not to be visible from the first surface S1 at least at the level of the first face 126.1 and the junction zone 133.

The fact that the stitching of the first seam 140 is offset relative to, and at a distance from the first surface S1 at the level of the junction zone 133 and the first face, makes it possible to prevent the resin reaching the first layer 132 by migrating along the threads of the first seam 140. This arrangement makes it possible to limit the propagation by migration of resin toward the first surface S1 and the formation of localized zones of accumulation of resin. At least at the level of the first face and of the junction zone, the first surface S1 of the frame 118.1, therefore, exhibits a more homogeneous behavior and does not generate visual modification of the paint.

In an embodiment that can be seen in FIG. 7, the frame 118.1 includes at least one second seam 142 offset from the junction zone 133, from the first face corresponding to the exterior face 126.1 of the first part 126, and preferably from the second face corresponding to the lateral face 130. This second seam 142 may include stitching that passes through all the fiber layers 132, 134, 134' and is visible from the first surface S1.

In contrast to the prior art, the frame 118.1 does not include any conductive material layer covering the first layer 132 of dry fibers, at least at the level of the first and second faces (corresponding to the exterior face 126.1 of the first part 126 and to the lateral face 130) and of the junction zone 133. The surface S1, therefore, has a homogeneous appearance in these zones.

As shown in FIG. 8, method 800 includes a step of assembling fiber layers 132, 134 and at least one reinforcement 136 situated at the level of the junction zone 133. The method of manufacturing the frame 118.1 includes a step of assembling the various layers 132, 134, 134', the reinforcement 136, and the barrier layer 138, by stacking them. During this assembly step, at least one barrier layer 138 is positioned between the reinforcement 136 and the first surface S1 in such a manner as to cover the reinforcement 136 and to form a barrier limiting the propagation of resin in the direction of the first surface S1. During the assembly step, at least one first seam 140 may be produced to connect the reinforcement 136 and the barrier layer 138 when assembled. This first seam 140 includes stitching that cannot be seen from the first surface S1 and is at a distance from the latter in order to limit the propagation of resin toward the first surface S1. Alternatively, to keep the various layers 132, 134, 134' interconnected before they are polymerized or consolidated, the method 800 includes a step 815 of scattering resin between the layers and heating to a temperature on the order of 80° C. below a polymerization or consolidation temperature to activate the tackiness of the resin. It is, therefore, no longer necessary to provide seams.

Next, the method 800 includes a step 820 of consolidation or of polymerization of the resin, the assembly comprising the various layers 132, 134, 134', the reinforcement 136 and the barrier layer 138 being positioned on a mold and covered with at least one flexible envelope that is sealed and connected in a sealed manner to the mold all around the assembly. During the consolidation or polymerization step, the assembly is subjected to a cycle of pressure and temperature. In one operating procedure, the various layers 132, 134, 134' are dry and not pre-impregnated. In this case, during the consolidation or polymerization step, the fibers of the various layers 132, 134, 134' are embedded in a heatset resin in a resin transfer molding process.

Following this consolidation or polymerization step, the method 800 includes a step 830 of removal of the hardened frame 118.1 from the mold.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing an aircraft window frame, said aircraft window frame having a surface that has at least first and second faces extending all around the aircraft window frame and connected by a curved junction zone, said aircraft window frame being made of a composite material that includes fibers embedded in a resin matrix, the method of manufacture including steps of:

assembling, into a frame assembly, fiber layers and at least one reinforcement situated at a level of the junction zone and having first and second peripheral edges, into a mold, consolidating or polymerizing of the frame assembly, and removing the aircraft window frame from the mold, wherein during the step of assembling, a barrier layer is positioned between the at least one reinforcement and the surface in such a manner as to cover the at least one reinforcement and to form a barrier limiting propagation of resin in a direction of the surface.

2. The method as claimed in claim 1 of manufacturing an aircraft window frame, wherein during the step of assembling, the barrier layer is positioned in contact with the at least one reinforcement.

3. The method as claimed in claim 1 of manufacturing an aircraft window frame, wherein the barrier layer does not extend beyond first and second peripheral edges of the at least one reinforcement.

4. The method as claimed in claim 3 of manufacturing an aircraft window frame, wherein during the step of assembling, at least one seam is produced in such a manner as to connect at least the at least one reinforcement and the barrier layer, the seam including stitching offset from the surface at least at a level of the first and second faces.

5. The method as claimed in claim 1 of manufacturing an aircraft window frame, wherein the method includes a step of scattering a resin between the fiber layers and heating to a temperature below a polymerization or consolidation temperature to activate a tackiness of the resin in order to keep the fiber layers interconnected before the consolidation or polymerization step.

6. An aircraft window frame manufactured by the method as claimed in claim 1, said aircraft window frame comprising a surface that has at least first and second faces extending all around the aircraft window frame and connected by a curved junction zone, said aircraft window frame being made of a composite material that includes fibers embedded in a resin matrix, said aircraft window frame comprising a stack of layers and at least one reinforcement situated at a level of the junction zone and having first and second peripheral edges, wherein the aircraft window frame comprises at least one barrier layer covering the at least one reinforcement, positioned between the at least one reinforcement and the surface and configured to form a barrier limiting propagation of resin in a direction of the surface.

7. The aircraft window frame as claimed in claim 6, wherein the barrier layer is in contact with the at least one reinforcement.

8. The aircraft window frame as claimed in claim 6, wherein the barrier layer does not extend beyond the first and second peripheral edges of the at least one reinforcement.

9. The aircraft window frame as claimed in claim 6, wherein the barrier layer includes at least one ply of glass fibers.

10. The aircraft window frame as claimed in claim 6, wherein the aircraft window frame includes at least one seam connecting at least the at least one reinforcement and the barrier layer and including stitching spaced from the surface.

11. The aircraft window frame as claimed in claim 6, wherein the aircraft window frame includes at least one first layer of fibers interleaved between the at least one reinforcement and the surface.

12. An aircraft including at least one window frame as claimed in claim 6.

* * * * *